United States Patent
Guo

(10) Patent No.: US 10,927,798 B2
(45) Date of Patent: Feb. 23, 2021

(54) THERMAL ENERGY POWER DEVICE AND WORK-DOING METHOD THEREFOR

(71) Applicant: Yuanjun Guo, Yongzhou (CN)

(72) Inventor: Yuanjun Guo, Yongzhou (CN)

(*) Notice: Subject to any disclaimer, the term of this patent is extended or adjusted under 35 U.S.C. 154(b) by 163 days.

(21) Appl. No.: 15/323,958

(22) PCT Filed: Dec. 5, 2014

(86) PCT No.: PCT/CN2014/093133
§ 371 (c)(1),
(2) Date: Feb. 16, 2017

(87) PCT Pub. No.: WO2016/000403
PCT Pub. Date: Jan. 7, 2016

(65) Prior Publication Data
US 2017/0159620 A1 Jun. 8, 2017

(30) Foreign Application Priority Data
Jul. 4, 2014 (CN) .......................... 2014 1 03140526

(51) Int. Cl.
*F02M 31/14* (2006.01)
*F02B 75/02* (2006.01)
(Continued)

(52) U.S. Cl.
CPC .......... *F02M 31/145* (2013.01); *F02B 75/021* (2013.01); *F02M 31/18* (2013.01);
(Continued)

(58) Field of Classification Search
CPC .......... F02B 47/00; F02B 47/04; F02B 47/08; F02B 47/10; F02B 41/00; F02M 31/15;
(Continued)

(56) References Cited

U.S. PATENT DOCUMENTS 3,015,449 A 1/1962 Meyer
3,964,263 A 6/1976 Tibbs
(Continued)

FOREIGN PATENT DOCUMENTS

CN 101403350 A 4/2009
CN 101532420 A 9/2009
(Continued)

OTHER PUBLICATIONS

R. P. Fraser, Liquid Fuel Atomization, pp. 687-701.

*Primary Examiner* — Erick R Solis
*Assistant Examiner* — Robert A Werner
(74) *Attorney, Agent, or Firm* — Bayramoglu Law Offices LLC

(57) ABSTRACT

A thermal energy power device is disclosed. A gasification reactor is arranged on a TDC of a cylinder bulk of an internal combustion engine, wherein the gasification reactor includes gasifying plates (19) and gas holes (23). The gasifying plates are arranged with gaps on the TDC of the cylinder. The gas holes (23) are distributed evenly, in an array, or in a staggered manner on the gasifying plate (19). A cylinder head above the gasification reactor is provided with an atomizer (12). Heat absorption plates (26) are arranged inside the exhaust passage in parallel with an air flow direction. The heat absorption plates (26) absorb thermal energy of exhaust gas and transfer the thermal energy to the gasification reactor. The internal combustion engine is wrapped with an insulation layer. An added working stroke enables the temperature of the cylinder bulk to be lowered. The compression ratio is high. After being filtered by a cooler and a liquid storage tank, the discharged exhaust gas is more environmentally friendly than existing engines. After the temperature of the cylinder bulk is lowered, the discharged exhaust gas is filtered by the cooler and the liquid storage tank without noise. A working stroke is added, and (Continued)

the thermal energy utilization rate increases by 20%-95%. Thermal energy utilization is performed directly on the exhaust passage, and a heat dissipation water tank is not required.

11 Claims, 2 Drawing Sheets

(51) Int. Cl.
    *F02M 31/18*     (2006.01)
    *F02M 53/02*     (2006.01)
    *F02G 5/02*     (2006.01)

(52) U.S. Cl.
    CPC ............... *F02M 53/02* (2013.01); *F02G 5/02* (2013.01); *Y02E 20/18* (2013.01); *Y02T 10/12* (2013.01)

(58) Field of Classification Search
    CPC ........ F02M 31/18; F02M 53/02; F02M 26/13; F02M 26/14; F02M 26/22; F02M 26/36; F02M 26/41; F02M 31/14; F02M 31/145
    USPC ........ 123/64, 250, 252, 568.11–568.32, 668, 123/25 C, 543; 60/512, 514

See application file for complete search history.

(56) References Cited

U.S. PATENT DOCUMENTS

| | | | |
|---|---|---|---|
| 4,760,705 A | | 8/1988 | Yogev et al. |
| 4,790,284 A | * | 12/1988 | Ferrenberg .............. F02B 75/02 |
| | | | 123/543 |
| 5,540,191 A | * | 7/1996 | Clarke .................... F02B 47/02 |
| | | | 123/25 C |
| 6,546,909 B1 | * | 4/2003 | Clarke ...................... F02F 3/14 |
| | | | 123/254 |
| 9,115,325 B2 | * | 8/2015 | McAlister ............. C10L 1/1824 |
| 2011/0036309 A1 | * | 2/2011 | McAlister ............... F02M 27/02 |
| | | | 123/3 |

FOREIGN PATENT DOCUMENTS

| | | |
|---|---|---|
| CN | 104088695 A | 10/2014 |
| FR | 2323009 A1 | 4/1977 |
| GB | 2492827 A | 1/2013 |

\* cited by examiner

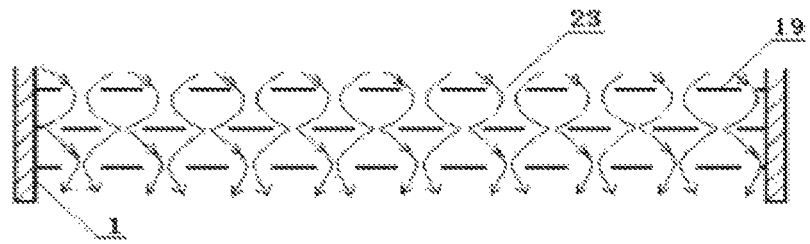
Figuer 2
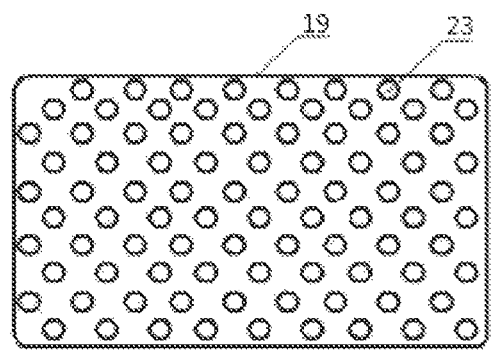
Figure 3
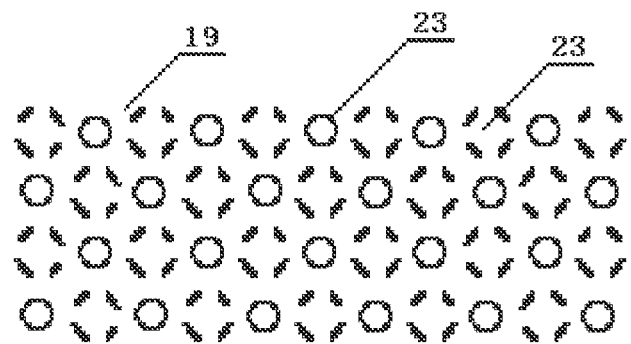
Figure 4

THERMAL ENERGY POWER DEVICE AND WORK-DOING METHOD THEREFOR

TECHNICAL FIELD

The present invention relates to the field of thermal energy power device, particularly to the thermal energy power device which uses the thermal energy of the internal combustion engine to convert the thermal energy into kinetic energy.

BACKGROUND

Each working cycle of a four-stroke engine is composed of an intake stroke, a compression stroke, a working stroke, and an exhaust stroke. For a four-stroke engine, in order to complete a working cycle, the piston in the cylinder needs to go back and forth for four times and the crankshaft turns twice. The four-stroke engine is further divided into four-stroke gasoline engines and four-stroke diesel engines. The main difference between these two kinds of four-stroke engines is the ignition mode. The gasoline engine uses a spark plug ignition, while the diesel engine uses a compression ignition.

The four-stroke engine belongs to the reciprocating piston internal combustion engine, which can be divided into three types—a gasoline engine, a diesel engine, and a gaseous fuel engine according to different types of fuel being used. The reciprocating internal combustion piston engine which uses gasoline or diesel as fuel is called the gasoline engine and the diesel engine respectively. The reciprocating piston internal combustion engines that use natural gas, liquefied petroleum gas, and other gaseous fuel are called the gaseous fuel engine. Gasoline and diesel are both petroleum products, and are traditional fuels for the automobile engine. Non-petroleum fuel is called substitute fuel. The engine which uses the substitute fuel is called substitute fuel engine, such as the ethanol engine, the hydrogen engine, the methanol engine etc.

In view of the heat balance of the current automobile engine, the power for power outputting generally accounts for only 30%-45% (diesel engine) or 20%-30% (gasoline engine) of the total heat of fuel combustion. The power which is discharged as residual heat out of the automobile accounts for 55%-70% (diesel engine) or 70%-80% (gasoline engine) of the total heat of fuel combustion, mainly including the heat taken away by recirculating cooling water and the heat taken away by exhaust gas. The following table is heat balance table of internal combustion engine.

| items of thermal balance % | gasoline engine | high-speed diesel engine | middle-speed diesel engine |
|---|---|---|---|
| heat of heat balance of effective work | 20-30 | 30-40 | 35-45 |
| heat taken away by coolant | 25-30 | 20-25 | 10-20 |
| heat taken away by exhaust gas | 40-45 | 35-40 | 30-40 |
| other heat loss | 5-10 | 5-10 | 10-15 |

The gasoline engine makes good mixture gas by mixing air with gasoline at a certain ratio. The mixture gas is inhaled into a cylinder during the intake stroke. Then the mixture gas is compressed and ignited to burn to generate thermal energy. The gas with high temperature and high pressure is doing work on the top of the piston to push the piston to perform reciprocating linear motion, outputting mechanical energy to the outside world through a connecting rod, a crankshaft, and a flywheel. The four-stroke gasoline engine accomplishes an intake stroke, a compression stroke, a working stroke, and an exhaust stroke within a working cycle.

Intake stroke: the piston is driven by the crankshaft to move from the top dead center (TDC) to the bottom dead center (BDC). An intake valve opens at the moment, an exhaust valve is closed, and a crankshaft rotates 180°. During the moving of the piston, the volume of the cylinder is gradually increased. The pressure of the gas in the cylinder is gradually decreased from pr to pa to form a certain vacuum degree. Mixture gas of air and gasoline is inhaled into the cylinder through the intake valve, and is further mixed in the cylinder to form a combustible mixture gas. Since the intake system has resistance, at the intake end point (Point A in the figure), the pressure of the gas in the cylinder is less than atmospheric pressure 0p, that is, pa=(0.80–0.90)0p. The temperature of the combustible mixture gas entered into the cylinder is increased to 340-400K, because the combustible mixture gas is heated by the intake pipe, the cylinder wall, the piston head, valves, the combustion chamber wall and other high-temperature parts, and is mixed with the residual exhaust gas.

Compression stroke: in the compression stroke, the intake valve and the exhaust valve are both closed at the same time. The piston moves from the BDC to the TDC, and the crankshaft rotates 180°. When the piston is moving upward, the working volume is reduced gradually. The pressure and the temperature of the mixture gas in the cylinder are constantly increased after the compression. When reaching the compression end point, the pressure pc of the mixture gas can reach 800-2000 kPa, and the temperature of the mixture gas reach 600-750K.

Working stroke: when the piston approaches TDC, the combustible mixture gas is ignited by the spark plug. The combustible mixture gas burns and releases a lot of heat, causing the pressure and temperature of the gas in the cylinder to increase rapidly. The maximum combustion pressure pZ reaches 3000-6000 kPa, and the temperature TZ reaches 2200-2800K. The gas with high temperature and high pressure pushes the piston moves from the TDC to the BDC, and outputs the mechanical energy to outside world through a crank and connecting rod mechanism. With the piston moving downward, the volume of the cylinder is increased, and the pressure and temperature of the gas are reduced gradually. When point b is reached, the pressure of the gas is reduced to 300-500 kPa, the temperature is reduced to 1200-1500K. In the working stroke, the intake valve and the exhaust valve are both closed, and the crankshaft rotates 180°.

Exhaust stroke: in the exhaust stroke, the exhaust valve is open, and the intake valve is still closed. The piston moves from the BDC to the TDC, and the crankshaft rotates 180°. When the exhaust valve is open, on one hand, the burned exhaust gas is discharged out of the cylinder under the effect of the cylinder pressure difference between inside and outside. On the other hand, the burned exhaust gas is discharged out of the cylinder by the pushing-out effect of the piston. Due to the resistant effect of the exhaust system, the pressure at the exhaust end point r point is slightly more than the atmospheric pressure, that is, pr=(1.05-1.20)p0. The temperature of the exhaust end point is Tr=900-1100K. When the piston moves to the TDC, a certain volume of exhaust gas is left and cannot be discharged. This part of the exhaust gas is called residual exhaust gas.

The four-stroke diesel engine is similar to the gasoline engine. Each working cycle is also composed of an intake stroke, a compression stroke, a working stroke, and an exhaust stroke. Since the diesel engine uses diesel as fuel, compared with the gasoline, the diesel has a low self-ignition temperature, large viscosity, and is hard to volatilize. The diesel engine uses compression end point self-ignition. The working process and system structure of the diesel engine are different from those of the gasoline engine.

Intake stroke: the working medium which enters the cylinder is pure air. Since the resistance of the intake system of the diesel engine is small, the pressure of the intake end point is pa=(0.85–0.95)p0, which is higher than that of the gasoline engine. The temperature of the intake end point is Ta=300-340K, which is lower than that of the gasoline engine.

Compression stroke: since the compressed working medium is pure air, the compression ratio of the diesel engine is higher than that of the gasoline engine (generally, ε=16-22). The pressure of the compression end point is 3000-5000 kPa. The temperature of the compression end point is 750-1000K, which is greatly more than the self-ignition temperature of the diesel (about 520 K).

Working stroke: when the compression stroke is approaching the end, under the effect of the high pressure oil pump, the diesel is injected with a high pressure of about 10 Mpa to the combustion chamber of the cylinder via a fuel injector. Upon being mixed with the air in a short time, the diesel self-ignites and burns immediately. In the cylinder, the pressure of the gas increases rapidly, reaching up to 5000-9000 kPa. The highest temperature is 1800-2000K. Since the diesel engine self-ignites and burns under compression, the diesel engine is called a compression ignition engine.

Exhaust stroke: the exhaust of the diesel engine is basically the same as that of the gasoline engine, only that the exhaust temperature is lower than that of the gasoline engine, generally, Tr=700-900K. As for the single-cylinder engine, the rotational speed is inhomogeneous, the working of the engine is unstable, and the vibration is severe. That is because only one stroke out of the four strokes is doing work, while the other three strokes are the strokes that consume power to prepare for working. To solve this problem, the flywheel must have sufficient rotational inertia, which will lead to the rising of the weight and size of the whole engine. Using multi-cylinder engine can offset the above deficiency. Modern automobiles usually use the four-cylinder engine, the six-cylinder engine, and the eight-cylinder engine.

After the cylinder in the above internal combustion engine works, the temperature in the cylinder reaches above 1000K. The high temperature gas is discharged through the exhaust valve, leading to the waste of the thermal energy directly. The temperatures of parts like the inner wall of the cylinder, the piston head, the cylinder head, the valves, etc. are high, which will affect the efficiency of compression stroke. Thus, the cooling system is provided on all the cylinders of the existing engine.

Regarding the utilization of the exhaust gas of the engine, current engines may have a turbo booster. After boosting, the pressure and temperature of the engine are significantly increased during the working. Therefore, the lifetime of the engine will be shorter than that of the engine which has the identical emission without boosting. Furthermore, the mechanical performance and the lubrication performance are both affected. Thus, the application of the turbo boost technology in the engine is limited in a certain degree.

The utilization of the waste heat of the exhaust gas is low. The energy recovery device should vibration and shock resistant. The waste heat recovery device of the exhaust gas cannot affect the normal working performance of the engine. Currently, methods of using the exhaust gas waste heat of the engine mainly are the following types. An exhaust turbocharge uses a part of the energy of the exhaust gas to improve the intake pressure of the internal combustion engine to increase the volume of gas, to improve the power property and economy of the engine. Currently, quite a few automobiles use the method of the turbo boost. However, the method of the turbo boost can only employ a part of the energy of the exhaust gas. Furthermore, there are problems, for example, the whole working condition of the engine being hard to match, and some other problems.

There are three methods of using the exhaust gas of the engine to generate power, i.e., the thermoelectric power generation, the exhaust gas turbine power generation, and the Freon turbine power generation. The thermoelectric power generation mainly uses thermoelectric power generation material to generate power. However, since the energy conversion rate of thermoelectric material is low, it is required that the thermoelectric conversion material with a high energy conversion rate should be developed. The exhaust gas turbine power generation uses the exhaust gas to drive the turbine to make the generator generate power. This method of power generation has certain influences on the performance of the engine, which needs further study. Currently, methods of refrigeration using the waste heat of the exhaust gas of the engine mainly are absorption refrigeration and sorption refrigeration. The principle of the absorption refrigeration is that the heat is used as power to accomplish the refrigeration cycle. The sorption refrigeration uses properties of some solid materials, which can absorb a certain gas or steam at a certain temperature and pressure, and can release the gas or steam at another temperature and pressure, to realize refrigeration. According to the present situation of the utilization of the waste heat of the exhaust gas of the engine at home and abroad, a concept of the method of using the waste heat of the exhaust gas of the engine to generate heat and power is provided.

The basic structure of the single-cylinder engine includes a cylinder, a piston, a connecting rod, a crankshaft, a cylinder head, a block, a camshaft, an intake valve, an exhaust valve, a valve spring, and a crankshaft toothed pulley, etc. The working chamber of the reciprocating piston engine is called a cylinder. The internal surface of the cylinder is cylindrical. The piston in the cylinder that performs reciprocating movement is hinged with one end of the connecting rod through a piston pin. The other end of the connecting rod is connected to the crankshaft to form the crank and connecting rod mechanism. When the piston performs reciprocating movements in the cylinder, the crankshaft is pushed to rotate by the connecting rod, or vice versa. At the same time, the volume of the cylinder is continuously changed from small to large, and then from large to small. The cycle is repeated continuously. The top of the cylinder is sealed with the cylinder head. The intake valve and the exhaust valve are mounted on the cylinder head. Through the opening and closing of the intake valve and the exhaust valve, the inflating of the gas into the cylinder and the discharging of the exhaust gas of the cylinder can be achieved. The opening and closing of the intake valve and the exhaust valve are driven by the camshaft. The camshaft is driven by the crankshaft through a toothed belt or a gear. The part which forms the cylinder is called the cylinder block. The crankshaft rotates in the crankcase.

Since the working medium does not burn, the external combustion engine avoids the knocking problem of working of the traditional internal combustion engine. Thus, the external combustion engine achieves a high efficiency, a low noise, a low pollution, and a low running cost. Once the heat chamber reaches 700° C., the equipment can work and run immediately. The lower the environmental temperature is, the higher the efficiency of power generation is. The most remarkable advantage of the external combustion engine is the output and efficiency are not limited by the altitude, which is suitable to be used in high altitude areas.

At the same time, the main existing problems and defects of the Stirling Engine are as follows. The manufacture cost is high. The sealing technology of working medium is difficult. The reliability and service life of the seal components have problems. The cost of the material is high. The power adjusting and controlling system is complicated. The machine is relatively bulky. The costs of the expansion chamber, the compression chamber, the heater, the cooling chamber, the regenerator, etc. are high. The heat loss is 2-3 times that of the internal combustion engine, etc.

Organic Rankine Cycle system includes a pump, an evaporator, an expander, a generator, a condenser, etc. The heat collector absorbs the solar irradiance, and the temperature of heat exchange medium in the heat collector is increased. The heat exchange medium transfers the heat to the organic medium through the evaporator. The organic medium is heated in the evaporator under a constant pressure. The gaseous organic medium with high pressure enters the expander to work to drive the generator to generate power. The organic medium which is discharged from the end of the expander enters the condenser to condense under a constant pressure. The organic medium from the outlet of the condenser enters the evaporator after being compressed by the pump to accomplish a generation cycle.

Organic Rankine Cycle system has problems of low conversion efficiency, large volume, and requiring an expander which has a complex structure to work.

The existing engine, especially, the multi-cylinder engine with a large emission, is noisy.

SUMMARY

The utilization of the exhaust gas in the prior art in the above section of Background is outside the cylinder, which needs to be equipped with an entire cycling system. The utilization of the waste heat of the exhaust gas is low. The energy recovery device should be vibration and shock resistant. The waste heat recovery device of the exhaust gas cannot affect the normal working performance of the engine. Currently, methods of using the exhaust gas waste heat of the engine mainly are the following types. An exhaust turbo booster uses a part of the energy of the exhaust gas to improve the intake pressure of the internal combustion engine to increase the volume of gas, so as to improve the power property and economy of the engine. Currently, quite a few automobiles use the method of the turbo boost. However, the method of the turbo boost can only employ a part of the energy of the exhaust gas. Furthermore, there are problems, for example, the whole working condition of the engine being hard to match and some other problems. There are three methods of using the exhaust gas of the engine to generate power, i.e., the thermoelectric power generation, the exhaust gas turbine power generation, and the Freon turbine power generation. The thermoelectric power generation mainly uses thermoelectric power generation material to generate power. However, since the energy conversion rate of thermoelectric material is low, it is required that the thermoelectric conversion material with a high energy conversion rate should be developed. The exhaust gas turbine power generation uses the exhaust gas to drive the turbine to make the generator generate power. This method of power generation has certain influences on the performance of the engine.

Currently, methods of refrigeration using the waste heat of the exhaust gas of the engine mainly are absorption refrigeration and sorption refrigeration. The principle of the absorption refrigeration is that the heat is used as power to accomplish the refrigeration cycle. The sorption refrigeration uses properties of some solid materials, which can absorb a certain gas or steam at a certain temperature and pressure, and can release the gas or steam at another temperature and pressure, to realize refrigeration. According to the present situation of the utilization of the waste heat of the exhaust gas of the engine at home and abroad, a concept of the method of using the waste heat of the exhaust gas of the engine to generate heat and power is provided.

The present invention effectively uses the technical characters that the cylinder of the internal combustion engine has high heat, and the cylinder needs to dissipate the heat and exhaust, and takes full advantage of the structure of the internal combustion engine to utilize the heat, such that the thermal energy generated by working is reused to generate mechanical energy. Thus, the following problems are overcome, that is, costs of the expansion chamber, the compression chamber, the heater, the cooling chamber, the regenerator, etc. of the external combustion engine are high, and the heat loss of the external combustion engine is 2-3 times that of the internal combustion engine, etc. The technical difficulties of the Organic Rankine Cycle system which requires an expander or a gas turbine and has a high manufacture cost are overcome.

The present invention provides a thermal energy power device which has a high thermal energy conversion efficiency, recyclable working medium, wherein the thermal energy generated by working in the cylinder can be converted into mechanical energy again.

The technical solution used by the present invention are as follows. A thermal energy power device includes a gasification reactor provided on the TDC of a cylinder bulk of an internal combustion engine, wherein the gasification reactor includes one or more gasifying plates and a plurality of gas holes. The gas holes are distributed evenly, in an array, or in a staggered manner on the gasifying plate. The cylinder head above the gasification reactor is provided with an atomizer. Heat absorbing plates are provided in parallel in a direction of gas flow inside the exhaust passage. The heat absorbing plates absorb thermal energy from exhaust and passing the thermal energy to the gasification reactor. The internal combustion engine cylinder bulk is wrapped with an insulation layer.

Further, after the heat absorbing plates are provided inside the exhaust passage, the diameter of the exhaust passage is enlarged, such that an increased resistance of the heat absorbing plates is canceled, an original exhaust ratio of the cylinder bulk and the exhaust passage is maintained.

Further, an arrangement of gaps between the heat absorbing plates does not affect an exhausting of an original cylinder.

Further, a dimension of gaps between the heat absorbing plates is arranged as 1.2-6 mm, and a thickness of the heat absorbing plates is 0.2-6 mm.

Further, the TDC of the cylinder of the internal combustion engine is provided with at least one layer of gasifying plate.

Further, wherein the dimension of the gaps between the gasifying plates is 1.2-6 mm.

Further, the gas holes on one gasifying plate and the gas holes on another gasifying plate are arranged in a staggered manner.

Further, the TDC of the cylinder of the internal combustion engine is provided with three layers of gap-distributed gasifying plates.

Further, the dimension of the gaps between the three layers of gap-distributed gasifying plate is 1.5-3.5 mm.

Further, the size of the gas hole is arranged such that a diameter of the gas hole on an upper layer of gasifying plate is half of a diameter of the gas hole on an adjacent lower layer of gasifying plate.

Further, a diameter of the gas hole on the first layer of gasifying plate is half of a diameter of the gas hole on a second layer of gasifying plate, and the diameter of the gas hole on the second layer of gasifying plate is half of a diameter of the gas hole on the third layer of gasifying plate.

Further, the diameter of the gas hole on the first layer of gasifying plate is 0.2-3.5 mm. The diameter of the gas hole on the second layer of gasifying plate is 0.4-7 mm. The diameter of the gas hole on the third layer of gasifying plate is 0.8-14 mm.

Further, the thickness of the gasifying plate is 0.2-6 mm.

Further, both the internal combustion engine cylinder and gasifying plates are made of thermally conductive metal material.

The working method of the above thermal energy power device is that after steps of working or exhausting of an existing engine, a gas injection working stroke and an exhaust stroke formed by the atomizer and the gasifying plates are added.

The six-stroke working method of the above thermal energy power device is that for a six-stroke engine, each working cycle includes an intake stroke, a compression stroke, a working stroke, and an exhaust stroke, a gas injection working stroke, and an exhaust stroke, wherein in order to complete one working cycle of the six-stroke engine, the piston in the cylinder needs to go back and forth for six strokes, and the crankshaft rotates for three times.

In the working method of the above thermal energy power device, the internal combustion engine can be a gasoline engine, a diesel engine, or a substitute fuel engine The internal combustion engine can be a dual-stroke engine, a four-stroke engine, a six-stroke engine, or other-stroke engines being added with the gas injection working stroke.

In the working method of the above thermal energy power device, the gas injection working stroke is as follows. The organic working medium is atomized through the atomizer on the cylinder head, and enters the first layer of gasifying plate. Thermal energy passes through the cylinder and the gasifying plate such that the atomized organic working medium is gasified quickly. The atomized gas and the gasified organic working medium enters the second layer of gasifying plate to be gasified continuously. After a certain air pressure is formed, the atomized gas and the gasified organic working medium enters a third layer of gasifying plate and are gasified continuously. The pressure increases so as to push the piston to work. Since a diameter of the gas hole increases layer by layer from the first layer to the third layer, an expanding rate of gaseous organic working medium speeds up step by step, and an air pressure increases gradually, pushing the piston to work again. After doing work, the piston pushes the exhaust to discharge.

Existing internal combustion engine uses the compression and expansion of the fuel to work. A large amount of thermal energy generated by burning is discharged with the exhaust. The present invention absorbs 45%-95% of the high-temperature thermal energy of the exhaust gas by providing the heat absorbing plate in the exhaust passage, so as to provide thermal energy for the gasification of the atomized working medium in the gasification reactor. The thermal energy is utilized effectively. Under the condition that the working of the internal combustion engine is not affected, a working stroke is added.

Advantages of the present invention are as below. The added working stroke reduces the temperature of the cylinder bulk. The compression ratio is high. Since the exhaust gas is filtered by the cooler and the liquid storage tank, the discharged exhaust gas is more environmentally friendly compared with that of existing engines. After the temperature of the cylinder bulk is reduced, the discharged exhaust gas is filtered by the cooler and the liquid storage tank without noise. A working stroke is added. The utilization rate of the thermal energy is improved by 20-95%. The thermal energy utilization is performed directly in the exhaust passage, and a heat dissipating water tank is not required.

BRIEF DESCRIPTION OF THE DRAWINGS

FIG. 2 is the profile view of the gasifying plate of the present invention;

FIG. 3 is the front view of the gasifying plate of the present invention;

FIG. 4 is the diagram of the staggered distribution of the gas holes on two adjacent layers of gasifying plates of the present invention;

Figure 1:
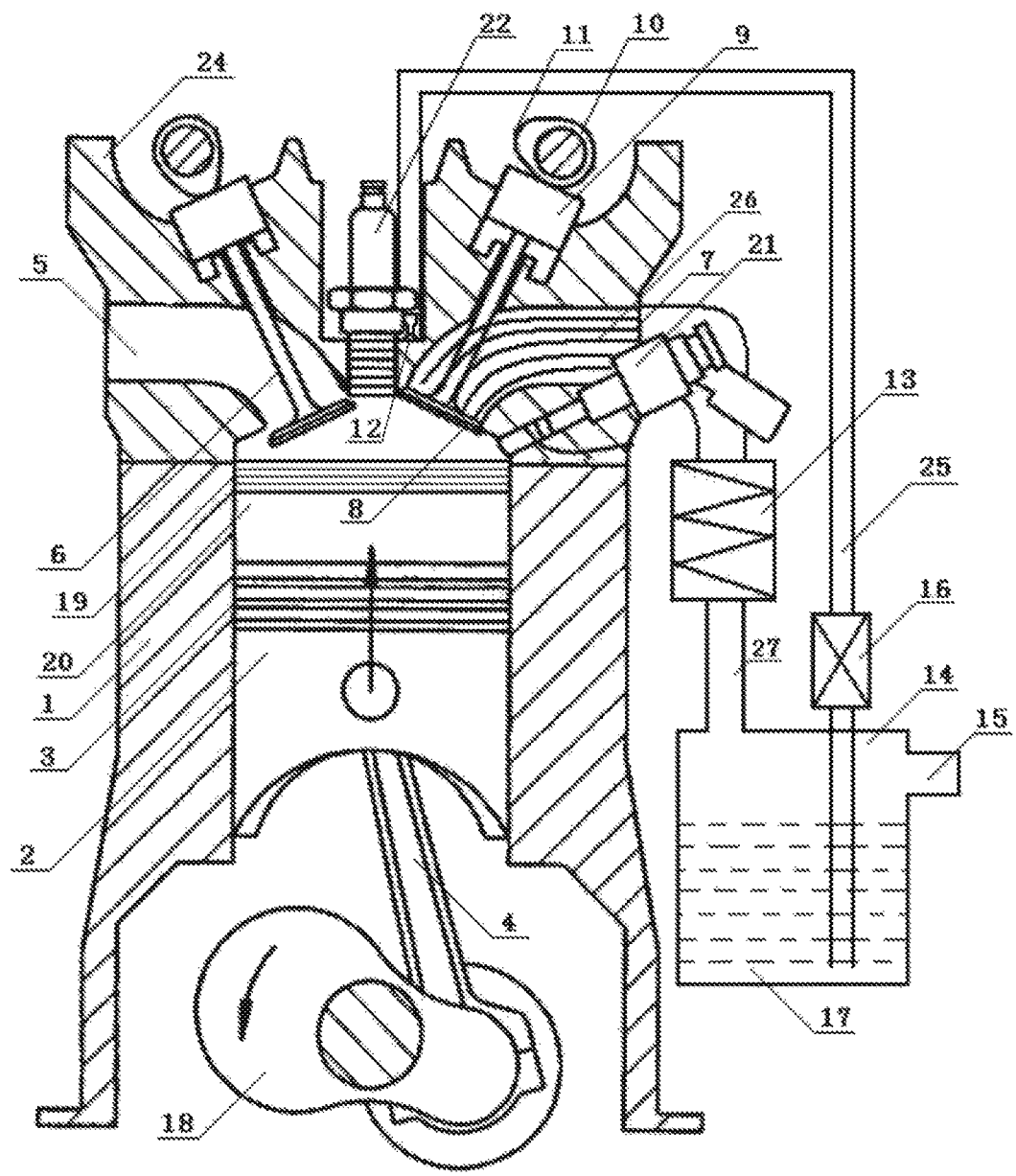
FIG. 1 is the structural schematic diagram of the thermal energy power device of the present invention.

In the drawings: 1 is cylinder bulk; 2 is piston; 3 is piston ring; 4 is connecting rod; 5 is air inlet passage; 6 is intake valve; 7 is exhaust passage; 8 is exhaust valve; 9 is valve moving mechanism; 10 is camshaft; 11 is apex; 12 is atomizer; 13 is cooler; 14 is liquid storage tank; 15 is exhaust port; 16 is pressure pump; 17 is working medium; 18 is crankshaft; 19 is gasifying plate; 20 is combustion chamber; 21 is fuel injector; 22 is spark plug; 23 is gas hole; 24 is cylinder head; 25 is pipe; 26 is heat absorbing plate.

DETAILED DESCRIPTION

Embodiments of the present invention are described in further detail with reference to FIGS. 1-4.

Embodiment 1

A thermal energy power device includes cylinder bulk 1, piston 2, piston ring 3, connecting rod 4, air inlet passage 5, intake valve 6, exhaust passage 7, exhaust valve 8, valve moving mechanism 9, camshaft 10, apex 11, crankshaft 18, combustion chamber 20, fuel injector 21, spark plug 22, and cylinder head 24. Cylinder bulk 1 is provided with combustion chamber 20 and piston 2. Piston 2 is provided with piston ring 3. Piston 3 is movably connected to connecting rod 4. Connecting rod 4 is connected to crankshaft 18. An upper portion of cylinder bulk 1 is provided with cylinder head 24. Cylinder head 24 is provided with air inlet passage 5, exhaust passage 7, spark plug 22, and fuel injector 21. Air inlet passage 5 is provided with intake valve 6. Exhaust passage 7 is provided with exhaust valve 8. Intake valve 6 and exhaust valve 8 are connected to valve moving mechanism 9. The projecting position of camshaft 10 is apex 11.

The thermal energy power device further includes atomizer 12 provided above cylinder head 24, gasifying plates 19 provided on cylinder bulk 1, gas holes 23 provided on gasifying plate 19, cooler 13 connected to exhaust passage 7 through pipe 25, liquid storage tank 14 connected to cooler 13 through pipe 25, pressure pump 16 connected to liquid storage tank 14 through pipe 25, atomizer 12 connected to pressure pump 16 through pipe 25. Liquid storage tank 14 is provided with exhaust port 15. Working medium 17 is in liquid storage tank 14. Pipe 25 inside liquid storage tank 14 extends to the bottom. After heat absorbing plate 26 is provided in the direction of the parallel gas flow inside exhaust passage 7, the diameter of exhaust passage 7 is enlarged, such that the increased resistance of heat absorbing plates 26 is canceled, and the original exhaust ratio of cylinder bulk 1 and exhaust passage 7 can be maintained. The arrangement of the gaps between heat absorbing plates 26 does not affect the exhausting of original cylinder. The gaps between heat absorbing plates 26 are arranged with a dimension of 1.2 mm. Preferably, the gaps between heat absorbing plates 26 are arranged with a dimension of 1.5 mm. Further preferably, the gaps between heat absorbing plates 26 are arranged with a dimension of 2 mm. Further preferably, the gaps between heat absorbing plates 26 are arranged with a dimension of 2.5 mm. Moreover, under the case of reducing the arranged number of heat absorbing plates 26, the thickness of heat absorbing plate 26 and the dimension of the gap can be increased. One layer of heat absorbing plate 26 is arranged with the thickness of 6 mm, and the gap is 6 mm. Preferably, two layers of heat absorbing plates 26 are provided with the thickness of 4.5 mm, and the gap is 4.5 mm. Further preferably, three layers of heat absorbing plates 26 are provided with the thickness of 2 mm, and the gap is 2 mm.

Embodiment 2

The thermal energy power device as described in Embodiment 1, the TDC of the cylinder of the internal combustion engine is provided with one to six layers of gasifying plates 19. The gap dimension of gap-distributed gasifying plate 19 is 1.2 mm, 1.5 mm, 1.8 mm, 2 mm, 2.5 mm, 2.8 mm, 3 mm, 3.6 mm, 3.8 mm, 4 mm, 4.2 mm, 4.5 mm, 4.8 mm, 5 mm, 5.5 mm, or 6 mm. The gap dimension of gasifying plates 19 is arranged according to the number of layers and the thickness of gasifying plates. The larger the gap dimension between gasifying plates 19 is, the thicker the gasifying plate 19 is. The larger the diameter of gas hole 23 is arranged, the less the number of layers of gasifying plates 19 is. The smaller the gap dimension of gasifying plate 19 is arranged, the thinner the gasifying plate 19 is. The smaller the diameter of gas hole 23 is, the more the number of layers of gasifying plate 19 is. Gap-distributed gasifying plate 19 and gas holes 23 on gasifying plate 19 are arranged in a staggered manner. Preferably, three layers of gap-distributed gasifying plates 19 are provided at the TDC of the internal combustion engine cylinder. The gap dimension of the three layers of gap-distributed gasifying plates 19 is 1.5 mm, 1.8 mm, 2 mm, 2.5 mm, 2.8 mm, 3 mm, 3.6 mm, or 3.5 mm. The size of the gas hole is arranged as follows. The diameter of the gas hole on the upper layer of gasifying plate is half of the diameter of the gas hole on the adjacent lower layer of gasifying plate. The diameter of the gas hole on the first layer of gasifying plate is half of the diameter of the gas hole on the second layer of gasifying plate. The diameter of the gas hole on the second layer of gasifying plate is half of the diameter of the gas hole on the third layer of gasifying plate. Further preferably, the diameter of the gas hole on the first layer of gasifying plate is 0.2 mm, 0.3 mm, 0.4 mm, 0.5 mm, 0.8 mm, 1 mm, 1.2 mm, 1.5 mm, 1.8 mm, 2 mm, 2.5 mm, 3 mm, or 3.5 mm. The diameter of the gas hole on the second layer of gasifying plate is 0.4 mm, 0.6 mm, 0.8 mm, 1 mm, 1.6 mm, 2 mm, 2.4 mm, 3 mm, 3.6 mm, 4 mm, 5 mm, 6 mm, or 7 mm. The diameter of the gas hole on the third layer of gasifying plate is 0.8 mm, 1.2 mm, 1.6 mm, 2 mm, 3.2 mm, 4 mm, 4.8 mm, 6 mm, 7.2 mm, 8 mm, 10 mm, 12 mm, or 14 mm. The thickness of the gasifying plate is 0.4 mm, 0.6 mm, 0.8 mm, 1 mm, 1.6 mm, 2 mm, 2.4 mm, 3 mm, 3.6 mm, 4 mm, 5 mm, or 6 mm. The internal combustion engine cylinder and the gasifying plates are made of thermally conductive metal material, which has a thermally conductivity coefficient more than 300 W/m·K. Alloys of gold, silver, and copper are preferred.

Embodiment 3

The thermal energy power device as described in Embodiment 1 or Embodiment 2 can be manufactured as single-cylinder, dual-cylinder, or multi-cylinder engine. With different working media, the utilization rate of the thermal energy is different. The structure of the present invention can be designed to be used in the gasoline engine, the diesel engine, or the substitute fuel engine if necessary.

What is claimed is:

1. A thermal energy power device, comprising
one or more gasifying plates provided on a Top Dead Center (TDC) of a cylinder bulk of an internal combustion engine; the one or more gasifying plates being positioned on the TDC of the cylinder bulk with one or more gaps; a plurality of gas holes provided on the one or more gasifying plates; the plurality of gas holes being distributed evenly, in an array, or in a staggered manner on each gasifying plate;
wherein an atomizer is provided on a cylinder head above the one or more gasifying plates; a plurality of heat absorbing plates being provided in parallel in a direction of a gas flow of an exhaust passage; the heat absorbing plates absorbing thermal energy from exhaust gas and passing the thermal energy to the one or more gasifying plates.

2. The thermal energy power device of claim 1 wherein at least one layer of the gasifying plate is provided on the TDC of the cylinder of the internal combustion engine; a dimension of each gap between gap-distributed gasifying plates being 1.2-6 mm; and the plurality of gas holes on one gasifying plate and the plurality of gas holes on an other gasifying plate being arranged in the staggered manner.

3. The thermal energy power device of claim 1, wherein the TDC of the cylinder of the internal combustion engine is provided with three layers of gap-distributed gasifying plates; the dimension of the gap between the three layers of gap-distributed gasifying plates being 1.5-3.5 mm;
wherein a size of the gas hole is arranged such that a diameter of the gas hole on an upper layer of gasifying plate is half of a diameter of the gas hole on an adjacent lower layer of gasifying plate; a diameter of the gas hole on a first layer of gasifying plate is half of a diameter of the gas hole on a second layer of gasifying plate, and the diameter of the gas hole on the second layer of gasifying plate is half of a diameter of the gas hole on a third layer of gasifying plate.

4. The thermal energy power device of claim 3, wherein the diameter of the gas hole on the first layer of gasifying plate is 0.2-3.5 mm; the diameter of the gas hole on the second layer of gasifying plate being 0.4-7 mm; the diameter of the gas hole on the third layer of gasifying plate being 0.8-14 mm; a thickness of the gasifying plate being 0.2-6 mm; the internal combustion engine cylinder and the one or more gasifying plates being made of thermally conductive metal material.

5. A working method of a thermal energy power device, comprising:
   configuring the thermal energy power device to include one or more gasifying plates, provided on a Top Dead Center (TDC) of a cylinder bulk of an internal combustion engine, the one or more gasifying plates being positioned on the TDC of the cylinder bulk with one or more gaps, providing a plurality of gas holes on the one or more gasifying plates; the plurality of gas holes being distributed evenly, in an array, or in a staggered manner on each gasifying plate;
   providing an atomizer on a cylinder head above the one or more gasifying plates;
   providing heat absorbing plates in parallel in a direction of a gas flow of an exhaust passage, wherein the heat absorbing plates absorb thermal energy from exhaust gas and passing the thermal energy to the one or more gasifying plates; and
   adding, a gas injection working stroke and an additional exhaust stroke formed by the atomizer and the one or more gasifying plates after a working stroke or an exhaust stroke of the internal combustion engine.

6. The working method of claim 5, wherein the internal combustion engine is a four-stroke engine added with the gas injection working stroke and the exhaust stroke, so that for a six-stroke engine, each working cycle includes an intake stroke, a compression stroke, the working stroke, the exhaust stroke, the gas injection working stroke, and the additional exhaust stroke, wherein in order to complete one working cycle of the six-stroke engine, a piston in the cylinder needs to go back and forth for six strokes, and the crankshaft rotates for three times.

7. The working method of claim 5, wherein the internal combustion engine is selected from the group consisting of a gasoline engine, a diesel engine, and an alternative fuel engine; and the internal combustion engine is further selected from the group consisting of a four-stroke engine, a six-stroke engine.

8. The thermal energy power device of claim 1, wherein the TDC of the cylinder of the internal combustion engine is provided with three layers of gap-distributed gasifying plates; the dimension of the gap between the three layers of gap-distributed gasifying plates being 1.5-3.5 mm;
   wherein a size of the gas hole is arranged such that a diameter of the gas hole on an upper layer of gasifying plate is half of a diameter of the gas hole on an adjacent lower layer of gasifying plate, a diameter of the gas hole on a first layer of gasifying plate is half of a diameter of the gas hole on a second layer of gasifying plate, and the diameter of the gas hole on the second layer of gasifying plate is half of a diameter of the gas hole on a third layer of gasifying plate.

9. The thermal energy power device of claim 2, wherein the TDC of the cylinder of the internal combustion engine is provided with three layers of gap-distributed gasifying plates; the dimension of the gap between the three layers of gap-distributed gasifying plates being 1.5-3.5 mm;
   wherein a size of the gas hole is arranged such that a diameter of the gas hole on an upper layer of gasifying plate is half of a diameter of the gas hole on an adjacent lower layer of gasifying plate, a diameter of the gas hole on a first layer of gasifying plate is half of a diameter of the gas hole on a second layer of gasifying plate, and the diameter of the gas hole on the second layer of gasifying plate is half of a diameter of the gas hole on a third layer of gasifying plate.

10. The thermal energy power device of claim 8, wherein the diameter of the gas hole on the first layer of gasifying plate is 0.2-3.5 mm; the diameter of the gas hole on the second layer of gasifying plate being 0.4-7 mm; the diameter of the gas hole on the third layer of gasifying plate being 0.8-14 mm; a thickness of the gasifying plate being 0.2-6 mm; and the internal combustion engine cylinder and the one or more gasifying plates being made of thermally conductive metal material.

11. The thermal energy power device of claim 9, wherein the diameter of the gas hole on the first layer of gasifying plate is 0.2-3.5 mm; the diameter of the gas hole on the second layer of gasifying plate being 0.4-7 mm; the diameter of the gas hole on the third layer of gasifying plate being 0.8-14 mm; a thickness of the gasifying plates being 0.2-6 mm; and the internal combustion engine cylinder and the one or more gasifying plate being made of thermally conductive metal material.

* * * * *